Jan. 27, 1953        L. NEWCOMB ET AL        2,627,042
TRANSMISSION HAVING POWER COUPLING DEVICE
Filed March 30, 1951        2 SHEETS—SHEET 1
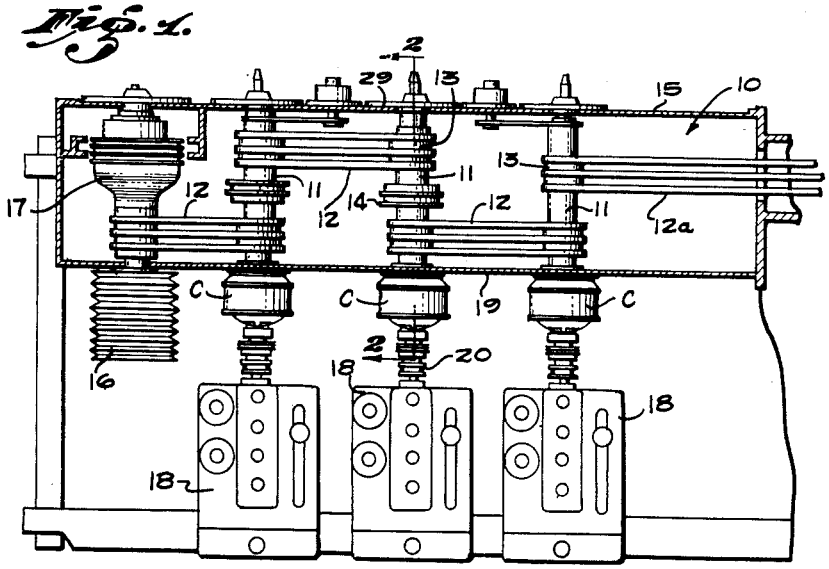
LEROY NEWCOMB,
ALBERT A. ASHTON,
INVENTORS.
BY
ATTORNEY

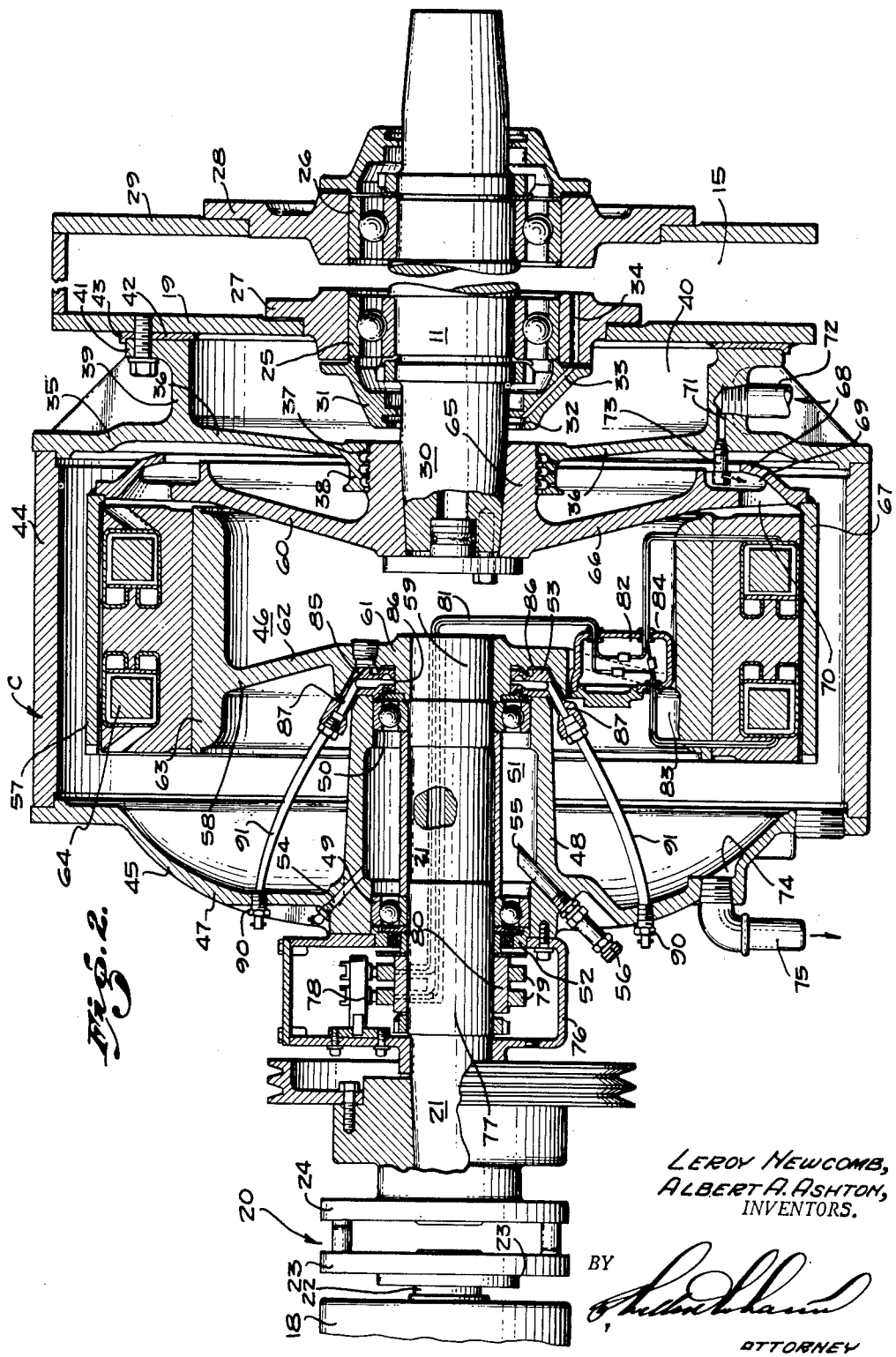

Patented Jan. 27, 1953

2,627,042

UNITED STATES PATENT OFFICE 2,627,042

TRANSMISSION HAVING POWER COUPLING DEVICE

Leroy Newcomb, Los Angeles, Calif., and Albert A. Ashton, Houston, Tex., assignors to Emsco Derrick & Equipment Company, Los Angeles, Calif., a corporation of California Application March 30, 1951, Serial No. 218,324

11 Claims. (Cl. 310—101)

Our invention relates to power transmission means of the general character employed for driving heavy equipment such as the drawworks of rotary drilling apparatus, and relates in particular to a simple transmission having a torque transmitting coupling mounted in a simple manner so that the power receiving shaft thereof may be connected to an engine supported adjacent the housing of the transmission.

In the general practice of the invention, the transmission, in the form thereof designed for use with rotary drilling equipment, has a number of shafts connected by selectively adjustable chain, sprocket and clutch means, a number of these shafts being arranged for driving by separate internal combustion engines arranged along a side wall of the transmission housing. The present invention provides a simple means for supporting a plurality of torque transmitting couplings on the housing of the transmission, each of these couplings having a projecting shaft element which may be connected to the shaft of an internal combustion engine through suitable connecting means such as a flexible coupling.

It is an object of the invention to provide a torque transmitting coupling for a transmission of the character described which is simple in form, does not require external supporting parts for the shell of the coupling, and in which operative alignment of the parts is maintained as the result of the manner in which all of the parts are supported on the housing of the transmission.

It is an object of the invention to provide a torque transmitting coupling which may be either hydraulic or electrical in its operation, this device having an outboard shaft element for connection to a power source, such as an internal combustion engine, supported by housing member which define a coupling chamber and which are all supported from a member which is secured to the face of the transmission coaxially of the transmission shaft which is to be driven.

A further object of the invention is to provide an electrically energized torque coupling having a first housing which is supported on the outer face of a transmission housing, this first housing having an end wall with bearing means for supporting a shaft element and there being a second housing mounted on the end wall of the first housing, to contain brush and collector ring means through which the electrical parts of the torque coupling may be energized.

Further objects and advantages of the invention will be brought out in the following part of the specification wherein we have described in detail a preferred embodiment of our invention for the purpose of completeness of disclosure of a fully operative form of the invention, without limitation of the scope of the invention set forth in the appended claims or limitation of the range of equivalents to which the claims are entitled.

Referring to the drawings which are for illustrative purposes only:

Fig. 1 is a schematic plan view, partly in section, showing engines arranged to drive a transmission having torque transmitting couplings according to our invention.

Fig. 2 is an enlarged sectional view taken as indicated at the line 2—2 of Fig. 1 to show details of the construction, this view omitting the showing of transmission elements within the housing of the transmission and showing the side walls of the housing and the opposite ends of the transmission shaft brought close together.

In Fig. 1 we show a transmission 10 having transmission shafts 11 which are interconnected by chains 12 operating over sprockets 13, some of these sprockets 13 being fixed upon the shafts 11 and the others being connectible thereto through clutches 14. Chains 12a are shown extending to the exterior of the housing 15 of the transmission 10, for transmission of power to a driven device, such as the drawworks of an oil well derrick. At the opposite end of the housing 15 a pump-driving sheave is arranged to be driven from the transmission through a clutch 17 preferably of the air operated, frictional type.

Before the driving of the shafts 11 internal combustion engines 18 shown arranged along a side wall 19 of the transmission housing 15. These engines 18 are connected by flexible couplings 20 with the power receiving shaft elements 21 of power transmission couplings C which are mounted on the outer face of the wall 19 of the housing 15. As shown in Fig. 2, each engine 18 has a projecting shaft 22 on which the driving plate 23 is fixed. The driven plate 24 of the flexible coupling 20 is fixed on the outer or leftward end of the shaft element 21 in order that power from the engine 20 may be transmitted directly into the coupling C through the power input shaft element 21.

In Fig. 2 a transmission shaft 11 is shown supported by bearings 25 and 26 carried by bearing supports 27 and 28 mounted respectively in the side wall 19 and the side wall 29 of the transmission housing 15. So that it may receive driving torque, the shaft 11 has an end 30 which projects from the bearing 25 to the exterior of the housing 15. Around a part of this projecting shaft portion 30 there is an oil guard 31 in the form of a ring which is secured to the outer face of the bearing holder 27. The member 31 has a channel 32 within the outer portions thereof, which channel 32 communicates through a diagonal passage 33 with an opening 34 extended through the lower part of the body of the bearing holder 27, so that any small amount of oil which works out along the shaft 11 will be return through the passage means 33 and 34 to the interior of the transmission housing 15.

The coupling device C comprises a mounting member 35 having a radial wall 36 with an axial opening 37 defined by a hub 38. A cylindric wall 39 projects from the radial wall 36 toward the side wall 19 so as to define a recess 40 disposed in surrounding relation to the bearing 25 and enclosing the outwardly projecting portion of the bearing support 27 and the oil guard 31. The supporting member 35 has means for attaching it directly to the wall 19, such means consisting of a flange 41 arranged to be bolted against a circular pad 42 secured to the outer face of the wall 19 concentrically of the bearing 25, this pad 42 providing a shoulder 43 for engaging the flange 41 in a manner to hold the same concentric to the axis of the shaft 11.

The shell of the coupling device C has a circumscribing wall 44 extending leftwardly or outwardly from the peripheral portion of the supporting member 35. This circumscribing wall 44 is preferably cylindrical. An end wall 45 is connected to the leftward edge of the circumscribing wall 44 and cooperates with the parts 36 and 44 to define a chamber 46. The end wall 45 has an outwardly bulging wall portion 47 carrying an integrally bearing support 48 which comprises a cylindrical wall extending into the chamber 46. The bearing support 48 supports bearings 49 and 50 coaxially of the shaft 11, for support of the shaft element 21. The bearing support 48 defines an oil chamber 51 which is closed at one end by a grease seal 52 and at the other by a sealing device 53 adapted to prevent escape of oil from the chamber 51 and to prevent entry of water from the chamber 46 into the chamber 51. A lubricant inlet 54 communicates with an upper portion of the chamber 51, and an oil overflow pipe 55 is extended diagonally from the exterior into the lower portion of the chamber 51, this overflow pipe having a removable cap 56 on its outer end, which cap 56 is removed during the time oil is being fed into the chamber 51 through the inlet 54. When oil starts to flow out through the pipe 55, addition of oil through the inlet 54 is discontinued because of the indication that the oil level in the bottom of the chamber 51 is at proper height.

Torque from the shaft element 21 is transmitted to the transmission shaft 11 by a torque transmitting coupling 57 which is characterized by its ability to vary the torque transmission in accordance with variations in power utilization of the transmission parts to which the shaft 11 is connected within the transmission housing 15. The coupling 57 includes a part 58 which is fixed on the inner end 59 of the shaft element 21 and a part 60 which is fixed on the end of the shaft 11 which projects into the chamber 46. The coupling part 58 has a hub 61 from which a web 62 extends radially and supports a cylindric wall adapted to carry the electro-magnetic elements 64 of the coupling 57. The part 60 has a hub 65 which is mounted on the shaft portion 30 and projects into the opening 37 of the hub 38. A web 66 extends outwardly from the hub 65 and supports a cylindrical wall 67 in surrounding relation to the electro-magnetic elements 64. On the outer (rightward) face of the web 66, near its periphery, there is an inwardly directed lip 68 defining a channel 69 which communicates with the interior of the part 60 through a plurality of openings 70. The supporting member 35 has at the lower part thereof a water passage 71 to receive water from the piping 72, and a nozzle 73 is supported by the wall 36 in a position to direct water from the passage 71 into the channel 69. An overflow opening 74 is provided in the end wall 45 and piping 75 is connected to the opening 74 for carrying off water from the chamber 46.

A housing 76 is connected to an end wall 45 of the coupling C in surrounding relation to the portion 77 of the shaft element 21 between the end wall 45 and the flexible coupling part 24. This housing 76 contains and supports brushes 78 which engage collector rings 79 mounted on the shaft portion 77 by insulator means 80. Electrical connection with the electro-magnetic element 64 is made by connectors 81 which extend longitudinally of the shaft element 21 from the collector rings 79 to the interior of the chamber 46, wherein they are carried to the electrical junction box 82 supported in the wall 6—2 of the coupling part 58. From the junction box 82 connection with the electro-magnetic elements 64 is completed through conductors 83 and 84. The water sealing device 53 comprises an annular body 85 which is secured against the inner end of the bearing support 48. This body 85 is contained in an annular recess 86 formed in the portion of the hub 61 which faces the bearing support 48. The annular body 85 has an annular channel 86 which communicates with its inner face, and grease ducts 87 communicate with the channel 86. Grease induction fittings 90, supported by the end wall 45 are connected through the ducts 87 by tubes 91. A transmission constructed according to our herein disclosure embodies a separate arrangement whereby the transmission shafts and interconnecting elements are arranged to be driven through variable torque transmission couplings which are a part of the transmission and have projecting shafts to which power sources such as internal combustion engines may be readily connected by use of a flexible coupling.

We claim:

1. In a transmission and driving arrangement for use with a transmission housing having a side wall, a bearing supported by said side wall and a transmission shaft projecting from the interior of said housing through said side wall and said bearing to the exterior of said housing: a mounting member adapted to be secured to the outer face of said side wall, said mounting member having therein an opening for reception of the projecting end of said shaft and a recess confronting said side wall and being disposed in surrounding relation to said bearing; a circumscribing wall connected to and supported by said mounting member and projecting outwardly therefrom so as to define the outer limits of a chamber around the end of said shaft; an end wall for said chamber connected to and supported by said circumscribing wall, said end wall having a bearing support arranged axially of said first named bearing; bearing means in said support; a shaft element carried by said bearing means with the inner end thereof projecting into said chamber; coupling means on the outer end of said shaft element for connection to a power source; a power transmitting coupling in said chamber having first and second parts arranged so that one of said parts will transmit driving torque to the other, one of said parts being connected to the inner end of said shaft element and the other of said parts being connected to the end of said transmission shaft which projects into said chamber; a nozzle positioned so as to direct a fluid into one of said parts of said power transmitting coupling; and means for removal of fluid from said chamber.

2. In a transmission and driving arrangement for use with a transmission housing having a side wall, a bearing supported by said side wall and a transmission shaft projecting from the interior of said housing through said side wall and said bearing to the exterior of said housing: a mounting member adapted to be secured to the outer face of said side wall, said mounting member having therein an opening for reception of the projecting end of said shaft and a recess confronting said side wall and being disposed in surrounding relation to said bearing; a circumscribing wall connected to and supported by said mounting member and projecting outwardly therefrom so as to define the outer limits of a chamber around the end of said shaft; an end wall for said chamber connected to and supported by said circumscribing wall, said end wall having a bearing support arranged axially of said first named bearing; bearing means in said support; a shaft element carried by said bearing means with the inner end thereof projecting into said chamber; coupling means on the outer end of said shaft element for connection to a power source; a supporting member carried by said end wall adjacent the portion of said shaft element between said end wall and said coupling means; collector rings on said portion of said shaft element; contacts on said supporting member for engagement with said collector rings; an electrically energizable power transmitting coupling in said chamber having first and second parts arranged so that one of said parts will transmit driving torque to the other, one of said parts being connected to the inner end of said shaft element and the other of said parts being connected to the end of said transmission shaft which projects into said chamber; means extending along said shaft element from said collector rings to the interior of said chamber for connection of said collector rings to the electrically energizable parts of said power transmitting coupling; a nozzle positioned so as to direct a fluid into one of said parts of said power transmitting coupling; and means for removal of fluid from said chamber.

3. In a transmission and driving arrangement for use with a transmission housing having a side wall, a bearing supported by said side wall and a transmission shaft projecting from the interior of said housing through said side wall and said bearing to the exterior of said housing: a mounting member adapted to be secured to the outer face of said side wall, said mounting member having therein an opening for reception of the projecting end of said shaft and a recess confronting said side wall and being disposed in surrounding relation to said bearing; a circumscribing wall connected to and supported by said mounting member and projecting therefrom so as to define a chamber around the end of said shaft; an end wall for said chamber connected to and supported by said circumscribing wall, said end wall having a bearing support arranged axially of said first named bearing; bearing means in said support; a shaft element carried by said bearing means with the inner end thereof projecting into said chamber; coupling means on the outer end of said shaft element for connection to a power source; a housing connected to and supported by said end wall in a position to surround a portion of said shaft element between said end wall and said coupling means; collector rings supported on said portion of said shaft element in said housing; contacts in said housing for engagement with said collector rings; an electrically energizable power transmitting coupling in said chamber having first and second parts arranged so that one of said parts will transmit driving torque to the other, one of said parts being connected to the inner end of said shaft element and the other of said parts being connected to the end of said transmission shaft which projects into said chamber; and means extending along said shaft element from said collector rings and through said bearing means to the electrically energizable part of said power transmitting coupling.

4. In a transmission and driving arrangement for use with a transmission housing having a side wall, a bearing supported by said side wall and a transmission shaft projecting from the interior of said housing through said side wall and said bearing to the exterior of said housing: a mounting member adapted to be secured to the outer face of said side wall, said mounting member having therein an opening for reception of the projecting end of said shaft and a recess confronting said side wall and being disposed in surrounding relation to said bearing; a circumscribing wall connected to said mounting member and projecting therefrom so as to define the outer circumferential limits of a chamber around the end of said shaft; an end wall for said chamber connected to said circumscribing wall, said end wall having a bearing support arranged axially of said first named bearing; bearing means in said support; a shaft element carried by said bearing means with the inner end thereof projecting into said chamber; coupling means on the outer end of said shaft element for connection to a power source; and a power transmitting coupling in said chamber having first and second parts arranged so that one of said parts will transmit driving torque to the other, one of said parts being connected to the inner end of said shaft element and the other of said parts being connected to the end of said transmission shaft which projects into said chamber.

5. In a transmission and driving arrangement for use with a transmission housing having a side wall, a bearing supported by said side wall and a transmission shaft projecting from the interior of said housing through said side wall and said bearing to the exterior of said housing: a mounting member adapted to be secured to the outer face of said side wall, said mounting member having therein an opening for reception of the projecting end of said shaft and a recess confronting said side wall and being disposed in surrounding relation to said bearing; a circumscribing wall connected to and supported by said mounting member and projecting therefrom so as to define a chamber around the end of said shaft; an end wall for said chamber connected to and supported by said circumscribing wall, said end wall having a bearing support arranged axially of said first named bearing; bearing means in said support; a shaft element carried by said bearing means with the inner end thereof projecting into said chamber; and a power transmitting coupling in said chamber having first and second parts arranged so that one of said parts will transmit driving torque to the other, one of said parts being connected to the inner end of said shaft element and the other of said parts being connected to the end of said transmission shaft which projects into said chamber.

6. In a transmission and driving arrangement for use with a transmission housing having a side wall, a bearing supported by said side wall and a transmission shaft projecting from the interior of said housing through said side wall and said bearing to the exterior of said housing: a mounting member adapted to be secured to the outer face of said side wall, said mounting member having therein an opening for reception of the projecting end of said shaft and a recess confronting said side wall and being disposed in surrounding relation to said bearing; a circumscribing wall connected to and supported by said mounting member and projecting therefrom so as to define a chamber around the end of said shaft; an end wall for said chamber connected to and supported by said circumscribing wall, said end wall having a bearing support arranged axially of said first named bearing; bearing means in said support; a shaft element carried by said bearing means with the inner end thereof projecting into said chamber; a supporting member carried by said end wall adjacent the portion of said shaft element between said end wall and the outer end of said shaft element; collector rings on said portion of said shaft element; contacts on said supporting member for engagement with said collector rings; an electrically energizable power transmitting coupling in said chamber having first and second parts arranged so that one of said parts will transmit driving torque to the other, one of said parts being connected to the inner end of said shaft element and the other of said parts being connected to the end of said transmission shaft which projects into said chamber; and means extending along said shaft element from said collector rings to the interior of said chamber for connection of said collector rings to the electrically energizable parts of said power transmitting coupling.

7. In a coupling and supporting means for use with a transmission having a housing with a side wall, a bearing supported by said side wall and a transmission shaft extending from the interior of said housing through said side wall and said bearing to the exterior of said housing: a mounting member adapted to be secured to the outer face of said side wall, said mounting member having therein an opening for reception of the end of said shaft extending from said housing and a recess confronting said side wall and being disposed in surrounding relation to said bearing; a circumscribing wall connected to and supported by said mounting member and projecting therefrom so as to define a chamber around the end of said shaft; an end wall for said chamber connected to and supported by said circumscribing wall, said end wall having a bearing support arranged axially of said first named bearing; bearing means in said support; a shaft element carried by said bearing means with the inner end thereof projecting into said chamber; coupling means on the outer end of said shaft element for connection to a power source; a housing connected to and supported by said end wall in a position to surround a portion of said shaft element between said end wall and said coupling means; collector rings supported on said portion of said shaft element in said housing; contacts in said housing for engagement with said collector rings; an electrically energizable power transmitting coupling in said chamber having first and second parts arranged so that one of said parts will transmit driving torque to the other, one of said parts being connected to the inner end of said shaft element and the other of said parts being connected to the end of said transmission shaft which projects into said chamber; and means extending along said shaft element from said collector rings and through said bearing means to the electrically energizable part of said power transmitting coupling.

8. In a coupling and supporting means for use with a transmission having a housing with a side wall, a bearing supported by said side wall and a transmission shaft extending from the interior of said housing through said side wall and said bearing to the exterior of said housing: a mounting member adapted to be secured to the outer face of said side wall, said mounting member having therein an opening for reception of the end of said shaft extending from said housing and a recess confronting said side wall and being disposed in surrounding relation to said bearing; a circumscribing wall connected to and supported by said mounting member and projecting therefrom so as to define a chamber around the end of said shaft; an end wall for said chamber connected to and supported by said circumscribing wall, said end wall having a bearing support arranged axially of said first named bearing; bearing means in said support; a shaft element carried by said bearing means with the inner end thereof projecting into said chamber; coupling means on the outer end of said shaft element for connection to a power source; a supporting member carried by said end wall adjacent the portion of said shaft element between said end wall and said coupling means; collector rings on said portion of said shaft element; contacts on said supporting member for engagement with said collector rings; an electrically energizable power transmitting coupling in said chamber having first and second parts arranged so that one of said parts will transmit driving torque to the other, one of said parts being connected to the inner end of said shaft element and the other of said parts being connected to the end of said transmission shaft which projects into said chamber; and means extending along said shaft element from said collector rings to the interior of said chamber for connection of said collector rings to the electrically energizable parts of said power transmitting coupling.

9. In a coupling and supporting means for use with a transmission having a housing with a side wall, a bearing supported by said side wall and a transmission shaft extending from the interior of said housing through said side wall and said bearing to the exterior of said housing: a mounting member adapted to be secured to the outer face of said side wall, said mounting member having therein an opening for reception of the end of said shaft extending from said housing and a recess confronting said side wall and being disposed in surrounding relation to said bearing; a circumscribing wall connected to and supported by said mounting member and projecting therefrom so as to define a chamber around the end of said shaft; an end wall for said chamber connected to and supported by said circumscribing wall, said end wall having a bearing support arranged axially of said first named bearing; bearing means in said support; a shaft element carried by said bearing means with the inner end thereof projecting into said chamber; coupling means on the outer end of said shaft element for connection to a power source; and a power transmitting coupling in said chamber having first and second parts arranged so that one of said parts will transmit driving torque to the other, one of said parts being connected to the inner end of said shaft element and the other of said parts being connected to the end of said transmission shaft which projects into said chamber.

10. In a transmission and driving arrangement for use with a transmission housing having a side wall, a bearing supported by said side wall and a transmission shaft projecting from the interior of said housing through said side wall and said bearing to the exterior of said housing: a mounting member adapted to be secured to the outer face of said side wall, said mounting member having therein an opening for reception of the end of said shaft; a circumscribing wall connected to and supported by said mounting member and projecting therefrom so as to define a chamber around the end of said shaft; an end wall for said chamber connected to and supported by said circumscribing wall, said end wall having a bearing support arranged axially of said first named bearing; bearing means in said support; a shaft element carried by said bearing means with the inner end thereof projecting into said chamber; coupling means on the outer end of said shaft element for connection to a power source; and a power transmitting coupling in said chamber having first and second parts arranged so that one of said parts will transmit driving torque to the other, one of said parts being connected to the inner end of said shaft element and the other of said parts being connected to the end of said transmission shaft which projects into said chamber.

11. In a transmission and driving arrangement therefor: a mounted member having one end adapted to be secured to a support, said mounted member having therein an opening for reception of a shaft, and a recess at said one end adapted to have its peripheral wall disposed in spaced relation to said shaft, thereby providing space for a shaft bearing; a circumscribing wall connected to and supported by said mounting member and defining the circumferential limits of a chamber; an end wall for said chamber connected to and supported by said circumscribing wall, said end wall having a bearing support arranged axially of said first named bearing; bearing means in said support; a shaft element carried by said bearing means with the inner end thereof projecting into said chamber; a supporting member carried by said end wall adjacent the portion of said shaft element between said end wall and the outer end of said shaft element; collector rings on said portion of said shaft element; contacts on said supporting member for engagement with said collector rings; an electrically energizable power transmitting coupling in said chamber having first and second parts arranged so that one of said parts will transmit driving torque to the other, one of said parts being connected to the inner end of said shaft element and the other of said parts being connected to the end of said transmission shaft which projects into said chamber; and means extending along said shaft element from said collector rings to the interior of said chamber for connection of said collector rings to the electrically energizable parts of said power transmitting coupling.

LEROY NEWCOMB.
ALBERT A. ASHTON.

REFERENCES CITED

The following references are of record in the file of this patent:

UNITED STATES PATENTS

| Number | Name | Date |
|---|---|---|
| 2,500,814 | Gatiss | Mar. 14, 1950 |